United States Patent [19]

Bulatovic et al.

[11] Patent Number: 4,877,517

[45] Date of Patent: Oct. 31, 1989

[54] DEPRESSANT FOR FLOTATION SEPARATION OF POLYMETALLIC SULPHIDIC ORES

[75] Inventors: Srdjan Bulatovic, Peterborough; Tim M. Jessup, Lakefield, both of Canada

[73] Assignee: Falconbridge Limited, Toronto, Canada

[21] Appl. No.: 188,949

[22] Filed: May 2, 1988

[51] Int. Cl.$^4$ .............................................. B03D 1/02
[52] U.S. Cl. ..................................... 209/167; 252/61; 241/20; 209/39
[58] Field of Search ...................... 209/166, 167, 39, 3; 252/61; 241/20, 24; 423/26

[56] References Cited

U.S. PATENT DOCUMENTS

| | | | |
|---|---|---|---|
| 2,019,306 | 10/1935 | Handy | 209/167 |
| 2,070,076 | 2/1937 | Brown | 209/167 |
| 2,471,384 | 5/1949 | Booth | 209/167 |
| 3,912,623 | 10/1975 | Buza | 209/167 |
| 4,339,331 | 7/1982 | Lim et al. | 209/167 |

OTHER PUBLICATIONS

"The Use of Starches and Starch Derivatives as Depressants and Flocculants in Iron Ore Beneficiation" by Iwasaki, Carlson, Jr., and Parmerter Society of Mining Engineers, vol. 244, pp. 89–98, 3/69.

Primary Examiner—David L. Lacey
Assistant Examiner—Thomas M. Lithgow
Attorney, Agent, or Firm—Rogers, Bereskin & Parr

[57] ABSTRACT

A new depressant for use in enhanced separation of polymetallic sulphides is described. The depressant agent is used in conjunction with conventional collector agents and frothing agents in the flotation separation of copper, nickel, lead, zinc sulphides by depressing iron sulphides such as pyrrhotite, pyrite and marcasite in the tailing. The depressant consists of a cross-linked starch chemically combined with a polyacrylate and sugar free lignin sulphonate.

20 Claims, 2 Drawing Sheets

DEPRESSANT FOR FLOTATION SEPARATION OF POLYMETALLIC SULPHIDIC ORES

This invention relates to mineral separation of valuable metals by froth flotation. More specifically, this invention relates to mineral separation by froth flotation of valuable metal sulphides by the enhanced depression of iron sulphidic minerals.

Froth flotation is a well known process for obtaining mineral concentrates, and thereby reducing the bulk that needs to be handled by the extractive process to obtain the refined, or purified compound or element. In the case of obtaining valuable metals, the ore containing the value metals is concentrated into an enriched mineral fraction by known methods, such as froth flotation. The concentrate of the metals, or compounds, obtained by flotation is usually still diluted by other substances. The concentrate is generally treated in subsequent proces steps to further separate and purify the value metals contained in the ore. The term value metal is understood by metallurgists and mineral processing engineers to refer to the particular metal or metals to be extracted from the ore or concentrate by the process under consideration.

Several of the known metals are present in their ores as sulphides and/or oxides. Value metals as sulphides in their ores are often very intimately mixed with iron sulphides. The iron sulphides are usually of little use to the metallurgist and in order to obtain refined and purified metals such as copper, nickel, zinc, lead and similar value metals, it is advantageous to separate the iron sulphides as much as possible from the sulphides of the value metals at the early stages of the metal winning process. Such a separating process is froth flotation, and in the case of iron and other sulphide containing ores, it is usual to float the value metals off and depress the bulk of the iron sulphides to be retained in the tailing.

An essential feature of the froth flotation process consists of grinding the crude or raw ore to the fineness at which most of the mineral particles are liberated. The degree of grinding is dictated by the economical considerations of the subsequent process steps. Grinding may be dry or may be conducted in an aqueous medium. The ground ore is made to form a pulp or slurry with water. This aqueous ore slurry is then subjected to froth flotation in the presence of collectors or collecting agents, depressing agents and frothing agents. Prior to adding these agents to the aqueous slurry it is often advisable to condition the surface of the ore particles to enable the adsorption of these agents. The conditioning agents may be pH modifiers, slime coagulants or other reagents which will enhance the effectiveness of the collectors and depressants.

The collecting agent usually makes the mineral substances which are to be concentrated huydrophobic, thereby allowing air bubbles to be attached to the surface of the particles in the flotation device for forming a froth. The froth is then collected, dried or dewatered to provide a concentrate of the requisite substance.

Complete selectivity with respect to the separation of the individual minerals is difficult to achieve and often impure concentrates are produced which are further refined using other processes in subsequent treatment steps.

It is known to add other chemical reagents to improve the selectivity of the collecting agent. Such reagents may be so-called depressing agents known to depress unwanted substances. Depressants affect the flotation process by rendering the unwanted mineral hydrophilic (i.e. water wettable), thus reducing the possibility of the unwanted mineral to be floated simultaneously with those substances which are to be concentrated in the froth.

Substances used as gangue depressants in flotation processes cover a large variety of both organic and inorganic chemicals and these are well documented in the literature. The type of depressant used largely depends on the variety of mineral substances which accompany the value metals or compounds in the ore and which are to be separated by the mineral separation process. The mineral substances in different raw ores differ widely in surface chemistry as well as in composition.

The present process is aimed at depressing iron sulphides which are usually present in sulphidic ores as pyrrhotite, pyrite and marcasite, in the flotation separation of value metal sulphides. The depressant as described hereinabove, is incorporated in the conventional sulphidic ore benefication process which comprises a grinding step followed by treatment with reagents such as pH modifiers, collectors and other depressants affecting other components of the sulphidic ore. The treatment with these reagents may be accomplished in several conditioning stages. The froth flotation separation may be conducted in a single stage or in several stages wherein the seperated crude fraction (rougher concentrate) is cleaned several times after reconditioning with reagents.

In the case where magnetic pyrrhotite is present in the sulphidic ore, a magnetic separation stage may be incorporated in the mineral separation treatment. The final tailing obtained in a sulphidic ore flotation separation consists of pyrite, marcasite, pyrrhotite and other nonsulphidic gangue minerals.

In most of the known flotation separation processes for the treatment of sulphidic ores, the pyrrohite rejection has been found to be poor. Some commercial operations for obtaining copper-nickel concentrates from sulphidic ores have shown a low degree of selectivity towards pyrrhotite and the obtained concentrates showed high pyrrhotite contamination, thereby substantially increasing the cost of obtaining refined metallic copper and nickel.

In using other conventional reagents for the separation of massive copper-nickel or copper-zinc sulphides also containing pyrrhotite, it was found that some of the copper, nickel and zinc were also depressed with the pyrrhotite, thereby substantial portions of the value metals were lost in the tailing.

Sulphidic ores containing copper-zinc and pyrrhotite, wherein pyrrhotite represents a large amount of mineral, have so far not been satisfactorily separated by conventional reagents.

One of the objects of the present process is to provide a new pyrrhotite depressant as well as pyrite and marcasite depressant for the effective separation of copper-nickel sulphides, copper-zinc sulphides and copper-lead-zinc sulphides from pyrrhotite, pyrite and marcasite contained in sulphidic ores by means of froth flotation.

A new depressant for depressing pyrrhotite, pyrite and marcasite to the tailings of a flotation process has been found which is obtained by chemically combining a cross-linked causticized starch with a polyacrylic acid having a molecular weight range of 3000–4000 and with a lignin sulphonate having less than 0.1% sugar content.

Figure 1:
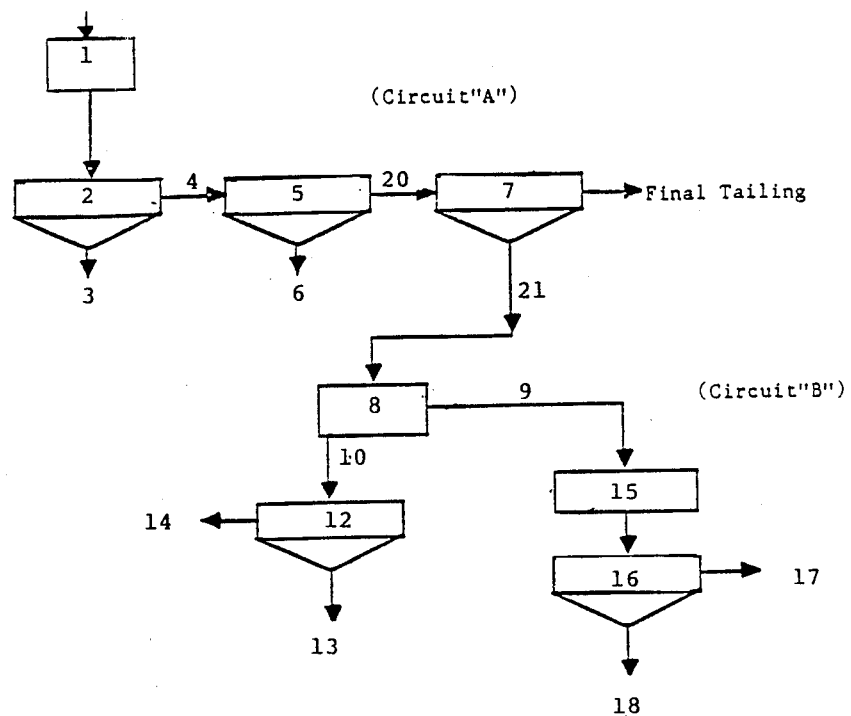
FIG. 1 is a schematic flowsheet of a commercial sulphidic ore beneficiation process incorporating the addition of the depressant of the present invention in one of the flotation separation steps.

A detailed description of the preferred embodiment of the present invention will now be provided below, and illustrated by working examples. The working examples will make reference to the flowsheets shown in FIGS. 1 and 2.

The preferred embodiment of the iron sulphide mineral depressant is based on a cationic starch compound. It is known to classify starch compounds into two main groups: cationic starch is a starch molecule which will bond to cations, and anionic starch which will form compounds with anions. The preferred starch used in the preparation of the depressant is corn starch, but any starch compound which has similar properties can be substituted.

The cationic starch is added to an alkaline solution such as a solution containing sodium hydroxide, potassium hydroxide, or other alkali metals or water soluble alkaline earth metals, to provide a causticized starch solution having a pH of 12 to 14. The causticization of the starch is usually carried out in a hot solution, but this is not a prerequisite of the causticization.

The causticized starch is then cross-linked with the addition of one of the following reagents: carbon disulphide, diethylenetriamine, or aminoacetonitrile bisulphate. The functional group of the latter is the $HSO_4^-$ radical. The cross-linking with one of the above reagents will turn the causticized starch solution into a viscous putty-like compound or paste.

The cross-linked starch is subsequently reacted with a relatively low molecular weight polyacrylic acid. It has been found that for the preferred form of depressant the most advantageous molecular weight range of the polyacrylic acid is 3000 to 4000. The reaction between the cross-linked starch and the polyacrylic acid is complete when no unbound acrylic acid is to be found in the resulting milky liquid.

The cross-linked starch polyacrylite suspension is subsequently with lignin sulphonate, preferably sodium lignin sulphonate, from which most of the sugar has been removed by known process steps. The sodium compound is preferred, but other water soluble alkali metal or alkaline earth metal lignin sulphonates may be substituted. To obtain the depressant of the preferred composition, it is necessary that the lignin sulphonate contains less than 0.1% sugar.

The resulting chemical mixture has a complex polymer structure which has a depressing effect on pyrrhotite, pyrite and marcasite when added to aqueous slurries containing valuable polymetallic sulphides including iron sulphides, without altering the flotability of sulphidic value minerals such as chalcopyrite, sphalerite, pentlandite, galena, complex copper-nickel sulphides and similar value metal sulphides.

The depressant of this invention is referred to in the examples hereinafter as PK depressant. Depending on the type of the cross-linking agent used for cross-linking of starch and the ratios of other reactants to cross-linked starch, the PK series of the presnet process extend from PKM to PK5.

The following examples illustrate the preparation of the PK depressant and the effectiveness of the depressant when utilized in froth flotation.

EXAMPLE 1

A cationic corn starch was slurried with water in the ratio of 2 parts starch to 1 part water and agitated until the starch has dissolved. The starch used in this example is available from Nacan Products Limited (a registered Canadian company) and is marketed under the tradename of Cato 15.

Cato 15 is a pearly white powder, with maximum moisture content of 15%. A 20% solids containing slurry in distilled water has a pH range of 3.2 to 4.2. Other characterizations of the starch are obtainable from the marketing company Nacan Product Limited. The general formula of the starch is given as $[C_6H_{10}O_5]_x$.

Chemical equivalents of this compound with similar characteristics may be substituted for Cato 15 starch.

To the aqueous starch solution prepared as indicated above, sodium hydroxide was added in an amount that is half the weight of the starch, i.e. starch to sodium hydroxide was about $2\pm0.5:1\pm0.5$ and the resulting mixture was agitated with heating at around 90° C. It is usual that the causticization of the starch by sodium hydroxide takes around 30–40 minutes, but this is a suggested reaction time only. The resulting aqueous solution was found to have a pH range of 12.5 to 13.5.

The causticized starch was subsequently cross-linked by reacting with one of the reagents: carbon disulphide, diethylenetriamine or aminoacetonitrile bisulphate. The reagent was slowly added with agitation. The reaction is usually complete, depending on the quantities used, in about one hour. The resulting cross-linked starch is viscous and pasty and has a putty-like consistency.

The cross-linked starch paste was reacted in a subsequent step with a polyacrylic acid of low molecular weight. The optimum molecular weight range was found to be 3000 to 4000. The polyacrylic acid of low molecular weight was added in a 25% (wt/wt) aqueous solution. Polyacrylic acid is commercially available from Allied Colloids Canada Incorporated under the tradename of Versicol E5. The most advantageous ratio of cross-linked starch to polyacrylic acid was found to be 2:1. However, the ratio of cross-linked starch to polyacrylic acid could vary from 5:1 to 1:1. The reaction was complete when no free acrylic acid was found to be present in the solution. The solutions' appearance was a milky white liquid after the reaction has been completed.

The chemical reagent, Versicol E5 may be substituted by other chemical equivalents.

The third component of the novel pyrhhotite depressant which is sodium lignin sulphonate containing less than 0.1% sugar, is added as a dry powder to the aqueous suspension of the cross-linked starch polyacrylate. The sugar free sodium lignin sulphonate is added in an amount that is equal to the dry weight of the polyacrylic acid, or Versicol E5 referred to hereinabove. Thus polyacrylic acid: sodium lignin sulphonate=1:1 in the resulting suspension. The aqueous suspension of cross-linked starch polyacrylate was agitated until all the sodium lignin sulphonate has dissolved. An exemplary compound for refined sodium lignin sulphonate is Kelig 100 (trade name) marketed by Reed Chemical Company.

The resulting complex polymer in the form of an aqueous suspension is added to the slurry of the ore together with conventional collector agents and frothing agents. The slurry of the sulphidic ore is then subjected to froth flotation in the conventional manner.

Table 1 lists the various pyrrhotite depressant agent compositions utilized in the froth flotation process. The compositions vary according to the cross-linking reagents and the ratio of the polyacrylic acid to the cross-linked starch.

The above reagents were deployed in an existing commercial operation treating the ore from the example. The results obtained are tabulated in Table 2.

TABLE 2

| Product | Weight % | Assays, % Cu | Ni | Pn* | Po** | % Distribution Cu | Ni | Pn | Po |
|---|---|---|---|---|---|---|---|---|---|
| Bulk Cl.*** Conc. | 15.2 | 8.88 | 8.53 | 21.29 | 40.89 | 90.0 | 81.0 | 83.0 | 37.0 |
| Middlings | 3.8 | 1.97 | 0.84 | 2.05 | 48.63 | 5.0 | 2.0 | 2.0 | 11.0 |
| Bulk Ro. Conc. | 19.0 | 7.50 | 6.99 | 17.44 | 42.44 | 95.0 | 83.0 | 85.0 | 48.0 |
| Bulk Ro. Tail. | 81.0 | 0.09 | 0.33 | 0.72 | 10.70 | 5.0 | 17.0 | 15.0 | 52.0 |
| Feed | 100.0 | 1.5 | 1.60 | 3.9 | 16.8 | 100.0 | 100.0 | 100.0 | 100.0 |

*Pentlandite
**Pyrrhotite
***Cleaner

The selectivity between the copper-nickel bearing minerals and pyrrhotite was poor. About 48% of the total pyrrhotite in the ore was reported in the copper-nickel concentrate, and only 52% in the tailing.

EXAMPLE 3

A mineral separation test was conducted on the same ore as in Example 2 using the same collecting and frothing agents as in Example 2 but omitting pH modifier and

TABLE 1

| Depressant | Starch No. 1 | Starch No. 2 | Starch No. 3 | Poly Acrylic Acid(E5) | KELIG 100 | CATO 15 | Carbon di-sulphide | Diethylene-triamine | Amino-acetonitrile bisulphate | NaCN | NaOH | $H_2O$ |
|---|---|---|---|---|---|---|---|---|---|---|---|---|
| PKM | 15 g | — | — | 3 g | 3 g | — | — | — | — | — | — | 200 mL |
| PK-1 | — | 15 g | — | 3 g | — | — | — | — | — | — | — | 200 mL |
| PK-2 | — | — | 15 g | 3 g | — | — | — | — | — | — | — | 200 mL |
| PK-3 | — | 15 g | — | 3 g | 3 g | — | — | — | — | — | — | 200 mL |
| PK-4 | — | — | 15 g | 3 g | 3 g | — | — | — | — | — | — | 200 mL |
| PK-5 | — | 15 g | — | 3 g | — | — | — | — | — | 3 g | — | 200 mL |
| Starch 1 | — | — | — | — | — | 100 g | 30 mL | — | — | — | 45 g | 560 mL |
| Starch 2 | — | — | — | — | — | 100 g | — | 30 mL | — | — | 45 g | 560 mL |
| Starch 3 | — | — | — | — | — | 100 g | — | — | 30 g | — | 45 g | 560 mL |

The following examples illustrate the improvements in mineral separation of value metals from pyrrhotite, pyrite and marcasite obtained by the utilization of the novel depressant in a conventional froth flotation process.

EXAMPLE 2

A flotation separation test was carried out in the conventional manner on a copper-nickel ore from the Sudbury region (Canada), containing 16.8% pyrrhotite, 1.5% copper and 1.6% nickel. The ore was ground to a fineness of 55% passing 200 mesh Tyler sieve and slurried in water to yield pulp densities of 35% solids. The following reagents were used:

Lime [Ca(OH)$_2$]=600 g/ton (to adjust pH to 9.0) - Lime is a conventional conditioner, Sodium Amyl Xantate=80 g/ton, conventional collector agent
DF250 (polyglycol)=15 g/ton frothing agent adding PKM depressant, the preparation and composition of which is provided in Example 1 above. The slurry was conditioned with depressant for 15 minutes before additions of collecting and frothing agents, then the slurry containing the reagents was subjected to rougher and cleaner flotation stages. The reagents used are shown below:

PKM=400 g/ton
Sodium Amyl Xanthate=80 g/ton, conventional collector agent
DF250=15 g/ton, conventional frothing agent The results obtained with the use of PKM depressing agent are shown in Table 3.

TABLE 3

| Product | Weight % | Assays, % Cu | Ni | Pn* | Po** | % Distribution Cu | Ni | Pn | Po |
|---|---|---|---|---|---|---|---|---|---|
| Bulk Cl.***Conc. | 9.02 | 15.23 | 14.65 | 36.80 | 26.63 | 91.0 | 81.1 | 83 | 14.3 |
| Middlings | 2.58 | 2.04 | 0.70 | 2.17 | 35.80 | 3.5 | 1.1 | 1.4 | 5.5 |
| Bulk Ro. Conc. | 11.60 | 12.3 | 11.55 | 29.1 | 28.67 | 94.5 | 82.2 | 84.4 | 18.8 |
| Bulk Ro. Tail. | 88.40 | 0.093 | 0.33 | 0.71 | 15.24 | 5.5 | 17.8 | 15.6 | 80.2 |
| Feed | 100.00 | 1.51 | 1.63 | 4.0 | 16.8 | 100.0 | 100.0 | 100.0 | 100.0 |

*Pentlandite
**Pyrrhotite
***Cleaner

Comparing the test results from Example 3 in which the depressant of the present invention was used with the results of Example 2 in which conventional reagents were used, it can be seen that when using PKM depressant over 80% of the pyrrhotite was rejected in the tailing. In the absence of the novel depressant PKM only 52% of the pyrrhotite was rejected in the final tailing.

EXAMPLE 4

Another copper-nickel ore from the Sudbury (Canada) area was concentrated in a commercial plant using a schematic flowsheet which is shown in FIG. 1.

FIG. 1 shows two circuits, Circuit A and Circuit B of a commercial plant.

As shown, the ore is ground in a grinding plant (1). The sulphides, including pyrrhotites, were then treated in Circuit A and passed to the primary rougher flotation cell (2). The concentrate (4) is passed to a secondary flotation cell (5). The residues or tailings, (3) of the primary rougher cell (2) and that (6) of the secondary rougher flotation cell (5) are treated separately. The residue of flotation cell (5) is passed to a scavenger cell (7). The tailing of scavenger (7) is a final tailing and is hence discarded. The concentrate (21) obtained in scavenger (7) was subjected to magnetic separation of circuit B by first passing it through magnetic separator (8). The separated magnetic fraction (9) is reground (15) and is then passed to a magnetic rougher flotation cell (16) to separate the pentlandite from the pyrrhotite. In the conventional operation of Circuit B, large quantities of pyrrhotite were floated together with the pentlandite, providing unsatisfactory separation.

Using the commercially obtained magnetic stream (9) which is a high pyrrhotite containing product, laboratory tests were carried out with additions of PKM depressant. Table 3 compares the results obtained in the plant and the results obtained in the laboratory on slurry (9) of FIG. 1 using PKM depressant.

As can be seen in Table 4, a substantial improvement in the magnetic concentrate grade was achieved with the use of PKM depressant in test FM28. It is clearly shown that over 90% of the pyrrhotite was rejected compared to 78.5% achieved in the commercial plant separation.

EXAMPLE 5

Magnetic fraction (9) of the concentrate obtained in scavenger (7) using the same material as in Example 4 (i.e. Circuit B feed of FIG. 1), a series of tests was carried out using different levels of depressant PKM additions. The results from these tests are illustrated in Table 5.

TABLE 5

| Test No. | PKM Added g/t | Product | Weight % | Assays, % | | | | % Distribution | | | |
|---|---|---|---|---|---|---|---|---|---|---|---|
| | | | | Cu | Ni | Pn* | Po** | Cu | Ni | Pn | Po |
| FM34 | 0 | Mag Conc. | 58.0 | 0.32 | 1.45 | 2.40 | 87.7 | 79.7 | 61.2 | 89.4 | 62.5 |
| | | Mag Tail. | 42.0 | 0.06 | 0.61 | 0.4 | 72.6 | 20.3 | 38.8 | 10.6 | 37.5 |
| | | Feed(Magnetics) | 100.0 | 0.21 | 1.10 | 1.59 | 81.3 | 100.0 | 100.0 | 100.0 | 100.0 |
| FM33 | 250 | Mag Conc. | 23.2 | 0.59 | 2.16 | 4.5 | 84.0 | 71.9 | 43.5 | 68.9 | 18.2 |
| | | Mag Tail. | 76.8 | 0.07 | 0.71 | 0.5 | 81.6 | 28.1 | 52.1 | 27.8 | 76.3 |
| | | Feed(Magnetics) | 100.0 | 0.19 | 1.05 | 1.4 | 82.1 | 100.0 | 100.0 | 100.0 | 100.0 |
| FM32 | 450 | Mag Conc. | 8.0 | 1.63 | 4.73 | 11.9 | 62.4 | 70.2 | 36.3 | 66.2 | 6.2 |
| | | Mag Tail. | 92.0 | 0.06 | 0.72 | 0.5 | 82.6 | 29.8 | 63.7 | 33.8 | 93.8 |
| | | Feed(Magnetics) | 100.0 | 0.19 | 1.04 | 1.4 | 81.0 | 100.0 | 100.0 | 100.0 | 100.0 |
| MM31 | 800 | Mag Conc. | 2.7 | 3.73 | 8.96 | 24.1 | 28.0 | 51.1 | 23.2 | 45.0 | 1.2 |
| | | Mag Tail. | 97.3 | 0.10 | 0.83 | 0.8 | 83.0 | 48.9 | 76.8 | 55.0 | 98.8 |
| | | Feed(Magnetics) | 100.0 | 0.20 | 1.05 | 1.5 | 81.7 | 100.0 | 100.0 | 100.0 | 100.0 |

*Pentlandite
**Pyrrhotite

Results obtained are shown in Table 5, and these clearly demonstrate that the new depressant of this invention is a powerful pyrrhotite depressant and gives good separation at an economical rate of addition. The decision of what is the best rate of depressant addition rests with the users, and is decided upon considering the economics of the entire mineral separation process.

EXAMPLE 6

A laboratory mineral separation tests was conducted on a copper-nickel-pyrrhotite containing ore which is utilized in a conventional commercial operation. The reagent dosages, types of collecting and frothing agents, were the same as those in the commercial plant. In the test of Example 6 the commercial continuous circuit was simulated.

Table 6 shows reagent additions and metallurgical results obtained in the conventional commercial operation. Comparative locked cycle tests were conducted on the commercial plant pulp using PKM depressant. The result of these tests are tabulated in Table 7.

TABLE 4

| Test No. | Description | Product | Weight % | Assays, % | | | | % Distribution | | | |
|---|---|---|---|---|---|---|---|---|---|---|---|
| | | | | Cu | Ni | Pn* | Po** | Cu | Ni | Pn | Po |
| P | Typical Plant Results *** | Mag. Conc(18) | 19.60 | 0.64 | 1.94 | 3.83 | 86.8 | 72.2 | 38.2 | 55.4 | 21.5 |
| | | Mag. Tail(17) | 80.40 | 0.06 | 0.77 | 0.75 | 77.6 | 27.8 | 61.8 | 44.6 | 78.5 |
| | | Feed(Magnet) | 100.0 | 0.17 | 1.00 | 1.36 | 79.4 | 100.0 | 100.0 | 100.0 | 100.0 |
| FM28 | Simul. Plant Condition + 450 g/t PKM | Mag Conc. | 8.8 | 1.58 | 5.30 | 13.4 | 69.3 | 72.7 | 41.0 | 70.1 | 10.1 |
| | | Mag Tail. | 91.2 | 0.06 | 0.75 | 0.6 | 88.3 | 27.8 | 59.0 | 29.9 | 91.2 |
| | | Feed(Magnet) | 100.0 | 0.19 | 1.17 | 1.7 | 86.5 | 100.0 | 100.0 | 100.0 | 100.0 |

*Pentlandite
**pyrrhotite
***obtained in magnetic rougher cell 16

TABLE 6

Reagents: Lime $Ca(OH)_2$ = 600 g/ton (pH Modifier)
Copper Sulfate $CuSO_4 \times 5H_2O$ = 120 g/ton activator
Potassium Amyl Xanthate = 180 g/ton Cu—Ni collector
Dow 250 = 50 g/ton frothing agent.

Results:

| Test | Product | Weight % | Assays, % | | | | % Distribution | | | |
|---|---|---|---|---|---|---|---|---|---|---|
| | | | Cu | Ni | Pn* | Po** | Cu | Ni | Pn* | Po** |
| Typical | Cu—Ni Bulk Conc. | 20.3 | 3.67 | 5.94 | 15.5 | 51.2 | 84.6 | 86.2 | 92.0 | 41.2 |
| Plant | Pyrrhotite Tail | 17.3 | 0.45 | 0.75 | 0.63 | 81.8 | 8.8 | 9.3 | 3.2 | 56.1 |
| Results | Scav. Tail. | 63.7 | 0.09 | 0.10 | 0.26 | 1.06 | 6.6 | 4.5 | 4.8 | 2.7 |
| | Comb. Tail. | 81.0 | 0.17 | 0.24 | 0.29 | 18.3 | 15.4 | 13.8 | 8.0 | 58.8 |
| | Feed | 100.0 | 0.87 | 1.38 | 3.36 | 25.1 | 100.0 | 100.0 | 100.0 | 100.0 |

*Pentlandite
**Pyrrhotite

TABLE 7

Reagents: PKM = 450 g/ton pyrrhotite depressant
Potassium Amyl Xanthate = 60 g/ton Cu—Ni collector  ⎫ conventional
Dow 250 = 15 g/ton frothing agent  ⎭ reagents Results

| Test | Product | Weight % | Assays, % | | | | % Distribution | | | |
|---|---|---|---|---|---|---|---|---|---|---|
| | | | Cu | Ni | Pn* | Po** | Cu | Ni | Pn* | Po** |
| Simulated | Cu—Ni Bulk Conc. | 12.20 | 6.64 | 10.19 | 27.47 | 36.17 | 92.81 | 84.0 | 92.4 | 17.2 |
| Plant | Pyrrhotite Tail. | 28.91 | 0.08 | 0.65 | 0.50 | 74.0 | 2.67 | 12.79 | 4.3 | 81.5 |
| With | Scavenger Tail. | 58.89 | 0.068 | 0.081 | 0.20 | 0.38 | 4.52 | 3.21 | 3.3 | 1.3 |
| Pk | Comb. Tail. | 87.80 | 0.072 | 0.27 | 0.30 | 24.3 | 7.19 | 16.0 | 7.6 | 82.8 |
| Add. | Feed | 100.00 | 0.87 | 1.48 | 3.60 | 25.7 | 100.00 | 100.00 | 100.0 | 100.0 |

*Pentlandite
**Pyrrhotite

It can be seen that when using depressant PKM (results shown in Table 7) over 82% of pyrrhotite was rejected in the final tailing, compared to 58.8% pyrrhotite rejection. In addition 41.2% of the pyrrhotite was included in the copper-nickel concentrate, as shown in Table 6, when the same conditions were used but without additions of the depressant described and prepared according to the present invention.

EXAMPLE 7

Figure 2:
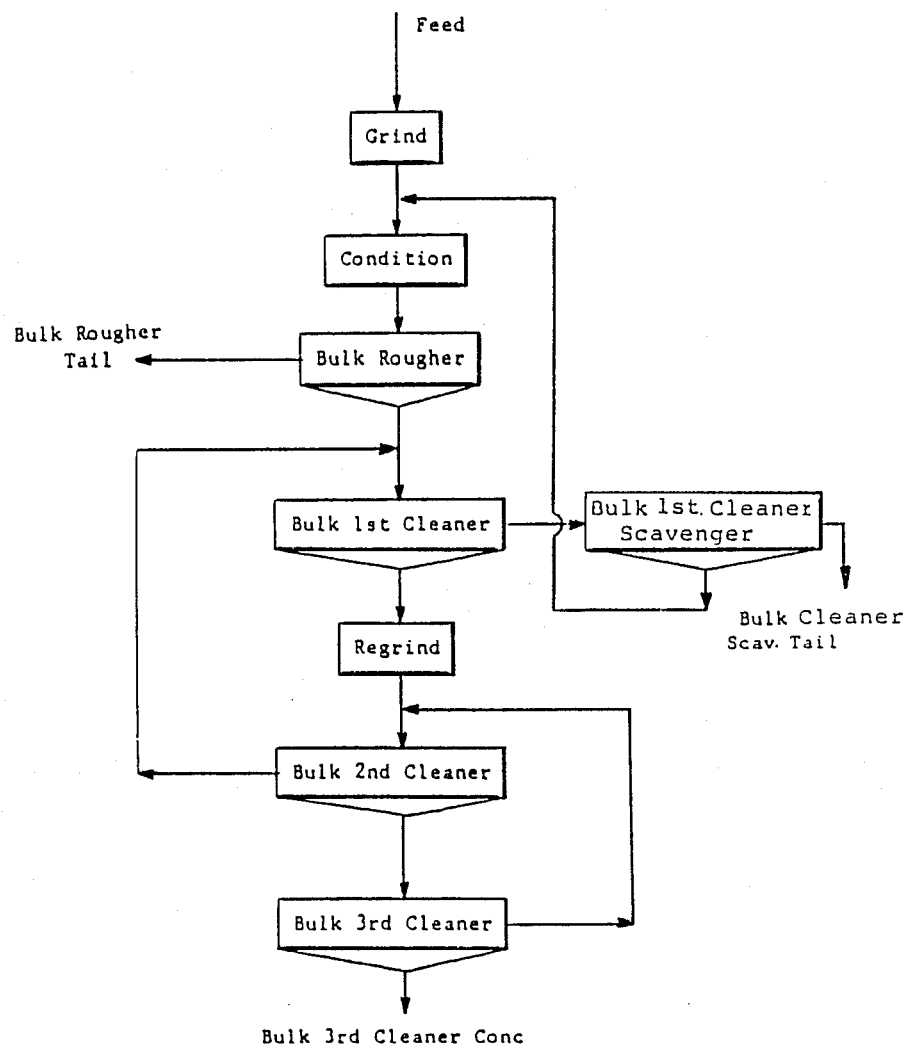
FIG. 2 is another flotation process step sequence utilizing the novel iron sulphate depressant.

A copper-nickel ore from British Columbia (Canada), containing large quantities of pyrite and pyrrhotite were treated in a laboratory continuous circuit, which was simulating a conventional commercial operation using treatment flowsheet shown schematically in FIG. 2. Comparative tests were run with and without additions of depressant PKM. The results of the comparative test indicating the effectiveness of PKM depressant of the present process, are shown in Table 8.

Significant improvement in the selectivity and in the rate of pyrrhotite-pyrite rejection were obtained with the use of Depressant PKM.

TABLE 8

Conditions Test 51: $Na_2CO_3$ = 2000 g/ton (pH Modifier)
Sodium Amyl Xanthate = 60 g/ton collector agent
Pine Oil = 200 g/ton frothing agent Conditions Test 52: $Na_2CO_3$ = 1500 g/ton (pH Modifier) - Conditioner
Sodium Amyl Xanthate = 60 g/ton collector agent
Pine Oil = 20 g/ton frothing agent
PKM = 250 g/ton depressant

| Test No. | Product | Weight % | Assays %, g/ton | | | | % Distribution | | | |
|---|---|---|---|---|---|---|---|---|---|---|
| | | | Cu | Ni | Pt | Pd | Cu | Ni | Pt | Pd |
| 51 | Cu—Ni Bulk Cl* Conc | 16.47 | 5.00 | 3.37 | 5.74 | 3.82 | 94.9 | 85.3 | 79.8 | 81.0 |
| | Cu—Ni Bulk Tail | 83.53 | 0.053 | 0.11 | 0.28 | 0.17 | 5.1 | 14.7 | 20.2 | 19.0 |
| | Head (Calc.) | 100.00 | 0.87 | 0.65 | 1.18 | 0.76 | 100.0 | 100.0 | 100.0 | 100.0 |
| 52 | Cu—Ni Bulk Cl* Conc | 8.26 | 10.26 | 5.69 | 9.47 | 7.01 | 94.1 | 76.8 | 68.3 | 70.6 |
| | Cu—Ni Bulk Cl* Tail | 91.74 | 0.058 | 0.16 | 0.39 | 0.26 | 5.9 | 23.2 | 31.7 | 29.4 |
| | Head (Calc.) | 100.00 | 0.90 | 0.61 | 1.15 | 0.82 | 100.0 | 100.0 | 100.0 | 100.0 |

*Cleaner

As shown, with the additions of PKM depressant in test 52, the grade of the bulk concentrate was much higher than that obtained in test 51 without PKM depressant additions.

Although the present invention has been described with reference to the preferred embodiment, it is to be understood that modifications and variations may be resorted to without departing from the spirit and scope of the invention, as those skilled in the art will readily understand. Such modifications and variations are considered to be within the purview and scope of the invention and the appended claims.

We claim:

1. A process for the froth flotation separation of value metal minerals and iron sulphidic minerals contained in polymetallic sulphidic minerals, wherein said iron sulphidic minerals contained in said polymetallic sulphidic minerals are being depressed, comprising the steps of:

(a) preparing a depressant agent by first chemically reacting a causticized cationic starch with a cross-linking agent selected from the group consisting of: carbon disulphide, aminoacetonitrile and diethylenetriamine, thereafter chemically combining the resultant cross-linked causticized cationic starch with a polyacrylate, and lastly chemically reacting the resultant cross-linked causticized cationic starch-polyacrylate with lignin sulphonate;

(b) adding said depressant agent to an aqueous slurry of the polymetallic sulphidic minerals in an amount sufficient to depress the iron sulphidic minerals when subjected to froth flotation, and (c) subjecting said aqueous slurry containing said depressant agent to froth flotation to obtain a predominantly non-ferrous sulphidic mineral-containing froth and a tailing containing said iron sulphidic minerals.

2. A process according to claim 1, wherein said cationic starch is causticized by heating with an alkaline solution having a pH range of 12 to 14.

3. A process according to claim 2 wherein aminoacetonitrile is added as the cross-linking agent in said first chemical reaction with said causticized starch, and said aminoacetonitrile has a bisulphate ($HSO_4^-$) radical as a functional group.

4. A process according to claim 3, wherein said causticized, cross-linked cationic starch is chemically combined with a polyacrylic acid having a molecular weight range between 3000 and 4000.

5. A process according to claim 4 wherein said cross-linked cationic starch polyacrylate is further chemically reacted with a lignin sulphonate having a sugar content of less than 0.1%.

6. A process according to claim 1 wherein said iron sulphidic minerals depressed by said agent include at least one of the group consisting of: pyrrhotite, pyrite, and marcasite.

7. A process according to claim 1, wherein said polymetallic sulphidic minerals include iron sulphidic minerals and at least one of the group consisting of copper sulphides, nickel sulphides and pentlandite.

8. A process according to claim 7, wherein said value metal minerals separated in the froth include at least one of the group consisting of: copper sulphide bearing minerals, nickel sulphide bearing minerals and pentlandite.

9. A process according to claim 7 wherein a portion of the pentalandite present in the polymetallic sulphidic minerals is depressed together with said iron sulphidic minerals and said pentlandite is subsequently separated from the iron sulphidic minerals by magnetic separation.

10. A process according to claim 1 wherein said polymetallic sulphidic minerals include pyrrhotite and copper-nickel bulk minerals and wherein said pyrrhotite is depressed in the tailing and said copper-nickel minerals are separated in the froth.

11. A process according to claim 10 wherein platinum group metals present in copper-nickel bulk minerals are also separated into the froth bearing copper-nickel minerals.

12. A process according to claim 1 wherein said polymetallic sulphidic minerals include at least two of the group consisting of: copper sulphides, chalcopyrites, copper-nickel sulphides, copper-zinc sulphides, copper-nickel bulk sulphides, copper-lead-zinc sulphides, pentlandite, pyrrhotite, pyrite and marcasite.

13. A process according to claim 12 wherein said iron sulphidic minerals comprise pyrite, marcasite, and pyrrhotite and said pyrite and marcasite are depressed with the pyrrhotite.

14. A process according to claim 12 wherein at least one of the group consisting of copper sulphide, chalcopyrite, copper-nickel sulphides, copper-zinc sulphides, copper-lead-zinc sulphides and pentalindite is separated into the froth by said flotation separation process.

15. A process according to claim 1 wherein said polymetallic sulphidic minerals include at least one of each of the following two groups of sulphidic minerals, said first group comprises iron sulphidic minerals consisting of pyrrhotite, pyrite and marcasite, and said second group comprises value metal minerals consisting of copper sulphides, chalcopyrites, copper-nickel sulphides, copper-nickel bulk sulphides, copper-lead-zinc sulphides and pentalandite.

16. A process for the mineral separation of polymetallic sulphidic minerals including firstly, at least one of a first group consisting of: copper sulphide, chalcopyrite, copper-nickel sulphide, copper-nickel bulk sulphides, copper-zinc sulphide, copper-lead-zinc sulphide, pentlandite, and secondly, at least one of a second group consisting of pyrrhotite, pyrite and marcasite, comprising the steps of:

(a) grinding said polymetallic sulphidic minerals and forming an aqueous slurry of the resulting ground polymetallic sulphidic minerals;

(b) subjecting the aqueous slurry of said ground polymetallic sulphidic minerals to a conditioning treatment;

(c) adding to the resultant conditioned slurry of said polymetallic sulphidic minerals in predetermined amounts a collecting agent for said at least one of the first group a frothing agent and a depressant agent for said at least one of the second group, said depressant agent having been produced by first chemically reacting a causticized cationic starch with a cross-linking agent selected from the group consisting of: carbon disulphide, aminoacetonitrile and diethylenetriamine, thereafter chemically combining the resultant cross-linked causticized cationic starch with a polyacrylate, and lastly chemically reacting the resultant cross-linked causticized cationic starch-polyacrylate with lignin sulphonate; and (d) subjecting the slurry of step (c) to froth flotation to obtain a froth containing at least one of the first group consisting of: copper sulphide, chalcopyrite, copper-nickel sulphide, copper-nickel bulk sulphides, copper-zinc sulphide, copper-lead-zinc sulphide, and pentlandite, and a tailing containing at least one of the second group consisting of pyrrhotite, pyrite and marcasite.

17. A process according to claim 16 wherein said cationic starch is causticized by heating with an alkaline solution having a pH range of 12 to 14.

18. A process according to claim 16, wherein aminoacetonitrile is added as the cross-linking agent in said first chemical reaction with said causticized starch, and said aminoacetonitrile has a bisulphate ($HSO_4^-$) radical as a functional group.

19. A process according to claim 18 wherein said causticized, cross-linked cationic starch is chemically combined with a polyacrylic acid having a molecular weight range between 3000 and 4000.

20. A process according to claim 19 wherein said cross-linked cationic starch polyacrylate is further treated with a lignin sulphonate having sugar content less than 0.1%.

* * * * *

UNITED STATES PATENT AND TRADEMARK OFFICE
CERTIFICATE OF CORRECTION

PATENT NO. : 4,877,517
DATED : October.31, 1989
INVENTOR(S) : Srdjan BULATOVIC, Tim M. JESSUP, James F. JACKSON It is certified that error appears in the above-identified patent and that said Letters Patent is hereby corrected as shown below:

On the Title Page, point [75] after "Lakefield" add

-- James F. JACKSON, Sudbury, --

Signed and Sealed this

Thirty-first Day of July, 1990

*Attest:*

HARRY F. MANBECK, JR.

*Attesting Officer*     *Commissioner of Patents and Trademarks*